(12) United States Patent
Petersson et al.

(10) Patent No.: US 11,355,864 B2
(45) Date of Patent: Jun. 7, 2022

(54) SIGNAL DISTRIBUTION NETWORK

(71) Applicant: Telefonaktiebolaget LM Ericsson (publ), Stockholm (SE)

(72) Inventors: Sven Petersson, Sävedalen (SE); Andreas Nilsson, Gothenburg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 976 days.

(21) Appl. No.: 16/070,795

(22) PCT Filed: Jun. 18, 2018

(86) PCT No.: PCT/EP2018/066095
§ 371 (c)(1),
(2) Date: Jul. 18, 2018

(87) PCT Pub. No.: WO2019/242835
PCT Pub. Date: Dec. 26, 2019

(65) Prior Publication Data
US 2021/0210871 A1 Jul. 8, 2021

(51) Int. Cl.
| | |
|---|---|
| H01Q 21/24 | (2006.01) |
| H01Q 1/24 | (2006.01) |
| H01Q 25/00 | (2006.01) |
| H04B 7/06 | (2006.01) |
| H04B 7/10 | (2017.01) |

(52) U.S. Cl.
CPC ............ *H01Q 21/24* (2013.01); *H01Q 1/246* (2013.01); *H01Q 25/001* (2013.01); *H04B 7/0617* (2013.01); *H04B 7/10* (2013.01)

(58) Field of Classification Search
CPC .... H01Q 21/24; H01Q 21/0006; H01Q 21/08; H01Q 25/001; H01Q 1/246; H04B 7/06; H04B 7/0617; H04B 7/08; H04B 7/10
See application file for complete search history.

(56) References Cited

U.S. PATENT DOCUMENTS

| | | |
|---|---|---|
| 8,212,732 B2 | 7/2012 | Petersson et al. |
| 2015/0263435 A1 | 9/2015 | Song et al. |
| 2016/0301458 A1 | 10/2016 | Petersson et al. |

OTHER PUBLICATIONS

International Search Report and Written Opinion of the International Searching Authority, PCT/EP2018/066095, dated Mar. 4, 2019, 20 pages.

*Primary Examiner* — Betsy Deppe
(74) *Attorney, Agent, or Firm* — Sage Patent Group

(57) ABSTRACT

A signal distribution network associated with first and second antenna ports and first and second pluralities of antenna elements is configured to feed a first signal to/from the first and second pluralities of antenna elements via distribution nodes using a first ordered weighting set and feed a second signal to/from the first and second pluralities of antenna elements via distribution nodes using a second ordered weighting set. The first ordered weighting set comprises a first weighting element for each distribution node, each non-zero valued first weighting element being configured to provide a first signal contribution factor for first and second polarizations when combined with the antenna element orientation. The second ordered weighting set comprises a second weighting element for each distribution node, each non-zero valued second weighting element being configured to provide a second signal contribution factor for first and second polarizations when combined with the antenna element orientation.

16 Claims, 3 Drawing Sheets

SIGNAL DISTRIBUTION NETWORK

CROSS REFERENCE TO RELATED APPLICATIONS

This application is a 35 U.S.C. § 371 national stage application of PCT International Application No. PCT/EP2018/066095 filed on Jun. 18, 2018, the disclosure and content of which is incorporated by reference herein in its entirety.

TECHNICAL FIELD

The present disclosure relates generally to the field of wireless transmission and reception of signals. More particularly, it relates to a signal distribution network for feeding signals to or from a plurality of antenna elements.

BACKGROUND

Unmanned aerial vehicles (UAV), also generally called drones, become more and more common in the society. Some example applications include aerial surveillance, professional aerial surveying, commercial filmmaking, motion picture filmmaking, news gathering for journalism, observation by police forces, search/rescue operations, scientific research, disaster relief, passenger transportation, cargo transportation, mail delivery, delivery to remotely located areas, etc.

It is expected that future drones will—e.g., for safety and performance reasons—typically be connected to wireless networks such as, for example, long term evolution (LTE) networks and/or new radio (NR) networks; both advocated by the Third Generation Partnership Project (3GPP).

To enable seamless connectivity for drones, coverage is needed at altitudes where drones typically operate; e.g., at least up to several hundreds of meters above ground level. Currently, base station antennas mainly focus on coverage at ground level by pointing one strong beam (a main lobe) towards the ground, and other altitudes are typically scarcely covered with side lobes. Such a side lobe antenna pattern typically provides very poor and spotty coverage for a drone in the air; potentially leading to many handovers and/or radio link failures.

An example of this approach is schematically illustrated in FIG. 1(*a*), where an example base station 100 is shown. The base station 100 has an antenna array 110 with a plurality of antenna elements ordered in pairs of antenna elements 111, 112, wherein each pair has an antenna element with horizontal antenna element orientation and one antenna element with vertical antenna element orientation. A typical transmission pattern is schematically illustrated by a main lobe 130 providing coverage at ground level and a plurality of side lobes 132 providing scattered coverage at altitude angles higher than ground level.

One way to mitigate this problem is to apply null-filling by rotating one of the antenna element pairs in the antenna array as proposed in U.S. Pat. No. 8,212,732 B2, and thereby create a smooth side lobe level.

An example of this approach is schematically illustrated in FIG. 1(*b*), where an example base station 150 is shown. The base station 150 has an antenna array 160 with a plurality of antenna elements ordered in pairs of antenna elements 161, 162. Each pair has an antenna element with horizontal antenna element orientation and one antenna element with vertical antenna element orientation, except for one pair 165 which is rotated in relation to the other pairs. A typical transmission pattern is schematically illustrated by a main lobe 170 providing coverage at ground level and a relatively smooth side lobe level 172 providing less scattered coverage at altitude angles higher than ground level.

As is well known, the orientation of antenna elements is associated with a polarization of the corresponding signal.

One problem with the solution illustrated in FIG. 1(*b*), where the antenna element orientation is rotated for one pair of antenna elements, is that the polarization orthogonality of the two ports is reduced, which generally has a negative impact, e.g., for multi-layer transmission and/or for diversity schemes.

Therefore, there is a need for alternative approaches to null-filling.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

It should also be noted that even though the problem formulation above is particularly exemplifying the drone scenario, this in no way intended as limiting. In fact, embodiments may be equally applicable in various other scenarios where null-filling and orthogonal polarization is desired.

Furthermore, the example problem mentioned above that nulls appear in different altitude angles is not to be considered as limiting. Rather, embodiments may be equally applicable to mitigate nulls appearing in different azimuth angles (or directions), or both.

It is an object of some embodiments to solve or mitigate, alleviate, or eliminate at least some of the above or other disadvantages.

According to a first aspect, this is achieved by a method of a signal distribution network configured to distribute first and second signals from, or to, respective first and second antenna ports to, or from, first and second pluralities of antenna elements via distribution nodes, wherein each distribution node is associated with at least one of the antenna elements.

Each antenna element has an antenna element orientation, and each of the first and second pluralities of antenna elements are orderly arranged in an antenna array such that at least some of the antenna elements of the first plurality are co-located with corresponding ones of the antenna elements of the second plurality.

The method comprises obtaining a first ordered weighting set comprising a first—zero valued or non-zero valued—weighting element for each distribution node, each non-zero valued first weighting element being configured to provide a first signal contribution factor for first and second polarizations when combined with the antenna element orientation for the distribution node, wherein at least one of the first signal contribution factors differs from the other first signal contribution factors.

Typically, this has the effect that a signal, weighted with the first ordered weighting set and transmitted via the elements, will—in any direction—have a main component with a main polarization and a complementary component (for nullfilling purposes) the polarization of which is orthogonal to that of the main component.

The method also comprises obtaining a second ordered weighting set comprising a second weighting element for each distribution node, each non-zero valued second weighting element being configured to provide a second signal contribution factor for the first and second polarizations when combined with the antenna element orientation for the distribution node.

The second signal contribution factor for the first polarization correspond to complex conjugates of the first signal contribution factor for the second polarization, in reverse order, and the second signal contribution factor for the second polarization correspond to negated complex conjugates of the first signal contribution factor for the first polarization, in reverse order.

The method further comprises feeding the first signal to, or from, the first and second pluralities of antenna elements via the distribution nodes using the first ordered weighting set, and feeding the second signal to, or from, the first and second pluralities of antenna elements via the distribution nodes using the second ordered weighting set.

In some embodiments, the first plurality of antenna elements have a same, first, antenna element orientation and the second plurality of antenna elements have a same, second, antenna element orientation, and wherein the first and second antenna element orientations are orthogonal.

In some embodiments, each distribution node is associated with exactly one of the antenna elements. Then, the first weighting elements of the distribution nodes of the antenna elements of the second plurality may be zero (except for an antenna element of the second plurality at a second end of the antenna array, where the first weighting element has a non-zero value), and each of the first weighting elements of the distribution nodes of the antenna elements of the first plurality may have a respective non-zero value (except for antenna elements of the first plurality at the second end and a first end of the antenna array, which first weighting elements are zero).

In some embodiments, the signal distribution network comprises a hybrid for a pair of antenna elements located in a center of the antenna array. The hybrid is configured to provide the first signal to, or from, a first antenna element of the pair at a first signal input phase and provide the second signal to, or from, the first antenna element of the pair at a second signal input phase. The hybrid is also configured to provide the first signal to, or from, a second antenna element of the pair at the first signal input phase and provide the second signal to, or from, the second antenna element of the pair at the second signal input phase plus $\pi$.

In some embodiments, each distribution node is associated with either exactly one of the antenna elements or exactly one hybrid node.

The antenna elements of the pair reside on a first side of the hybrid and the first and second weighting elements are applied at a second opposite side of the hybrid according to some embodiments, the first and second weighting elements of the antenna elements of the pair thereby affecting both antenna elements of the pair.

In some embodiments, the first weighting elements of the distribution nodes associated with exactly one of the antenna elements of the first plurality and the first weighting element of the distribution node associated with a first one of the hybrid nodes may be zero; and each of the first weighting elements of the distribution nodes associated with exactly one of the antenna elements of the second plurality and the first weighting element of the distribution node associated with a second one of the hybrid nodes may have a respective non-zero value, wherein the non-zero value of the first weighting element of the distribution node associated with the second one of the hybrid nodes is configured to compensate for the hybrid.

In some embodiments, the first plurality of antenna elements have a same first antenna element orientation and the second plurality of antenna elements have a same second antenna element orientation, wherein the first and second antenna element orientations are orthogonal; except for a pair of antenna elements located in a center of the antenna array, for which the antenna element orientations of the pair are orthogonal and rotated by a rotation angle relative the first and second antenna element orientations, respectively.

In some embodiments, each distribution node is associated with exactly one of the antenna elements. Then, the first weighting elements of the distribution nodes of the antenna elements of the second plurality may be zero, and the first weighting elements of the distribution nodes of the antenna elements of the first plurality may have a respective non-zero value, wherein the non-zero value of the antenna element of the first plurality comprised in the pair located in the center of the antenna array is configured to compensate for the rotation angle.

A second aspect is a computer program product comprising a non-transitory computer readable medium, having thereon a computer program comprising program instructions. The computer program is loadable into a data processing unit and configured to cause execution of the method according to the first aspect when the computer program is run by the data processing unit.

A third aspect is a signal distribution network for a wireless transmitter or receiver, the signal distribution network associated with first and second antenna ports and first and second pluralities of antenna elements, and configured to distribute first and second signals from, or to, respective ones of the first and second antenna ports to, or from, the first and second pluralities of antenna elements via distribution nodes, wherein each distribution node is associated with at least one of the antenna elements.

Each antenna element has an antenna element orientation, and each of the first and second pluralities of antenna elements are orderly arranged in an antenna array such that at least some of the antenna elements of the first plurality are co-located with corresponding ones of the antenna elements of the second plurality.

The signal distribution network is configured to cause feeding of the first signal to, or from, the first and second pluralities of antenna elements via the distribution nodes using a first ordered weighting set comprising a first weighting element for each antenna element, and feeding of the second signal to, or from, the first and second pluralities of antenna elements via the distribution nodes using a second ordered weighting set comprising a second weighting element for each antenna element.

The first ordered weighting set comprises a first—zero valued or non-zero valued—weighting element for each distribution node, each non-zero valued first weighting element being configured to provide a first signal distribution factor for first and second polarizations when combined with the antenna element orientation for the distribution node, wherein at least one of the first signal distribution factors differs from the other first signal distribution factors.

The second ordered weighting set comprises a second weighting element for each distribution node, each non-zero valued second weighting element being configured to provide a second signal distribution factor for the first and second polarizations when combined with the antenna element orientation for the distribution node.

The second signal distribution factor for the first polarization correspond to complex conjugates of the first signal distribution factor for the second polarization, in reverse order, and the second signal distribution factor for the second polarization correspond to negated complex conjugates of the first signal distribution factor for the first polarization, in reverse order.

A fourth aspect is a wireless transmitter and/or receiver comprising the signal distribution network of the third aspect. The wireless transmitter and/or receiver may further comprise the antenna array according to some embodiments.

A fifth aspect is a network node or wireless terminal comprising the wireless transmitter and/or receiver of the fourth aspect.

In some embodiments, any of the above aspects may additionally have features identical with or corresponding to any of the various features as explained above for any of the other aspects.

An advantage of some embodiments is that null-filling of a power pattern may be achieved.

Another advantage of some embodiments is that polarization orthogonality may be achieved.

Yet an advantage of some embodiments is that the normally experienced spotty coverage for drones will be reduced while still maintaining full orthogonality between the two antenna ports. By enabling full orthogonality between the antenna ports, diversity transmission schemes and higher-order spatial multiplexing transmission schemes will be improved.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

As already mentioned above, it should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

In the following, embodiments will be described where a signal distribution network is provided for simultaneous null-filling of the transmission/reception pattern and polarization orthogonality between signal ports.

It should be noted that, as described herein, the antenna elements are sorted into either of a first and a second plurality. This sorting does not necessarily correspond to the respective orientation of the antenna elements as will be seen in the following examples. For example, one or more of the antenna elements of one plurality may have an orientation that differs from that of the other antenna elements of the same plurality.

Later herein, it will be referred to that a (first or second) signal contribution factor for first and second polarizations is provided when a non-zero valued (first or second) weighting element is combined with the antenna element orientation of the corresponding distribution node. Generally, this may be related to a situation when a (first or second) signal—weighted with a non-zero valued (first or second) weighting element—is fed to one (or more; if a hybrid is used) antenna element via a distribution node. Then, a signal is provided with polarization given by the orientation of the antenna element (or given by the combined effect of the orientations of the antenna elements and the hybrid; if a hybrid is used). Thus, a signal with a composite polarization is provided when a weighted signal is fed (via a hybrid) to two, orthogonally oriented, antenna elements.

Generally, the first and second polarizations are two orthogonal polarizations. They can be arbitrary as long as they are orthogonal. One example is that one of the polarizations, say the first polarization, is identical to the polarization that corresponds to the orientation of a majority of the antenna elements of the first plurality.

Figure 2:
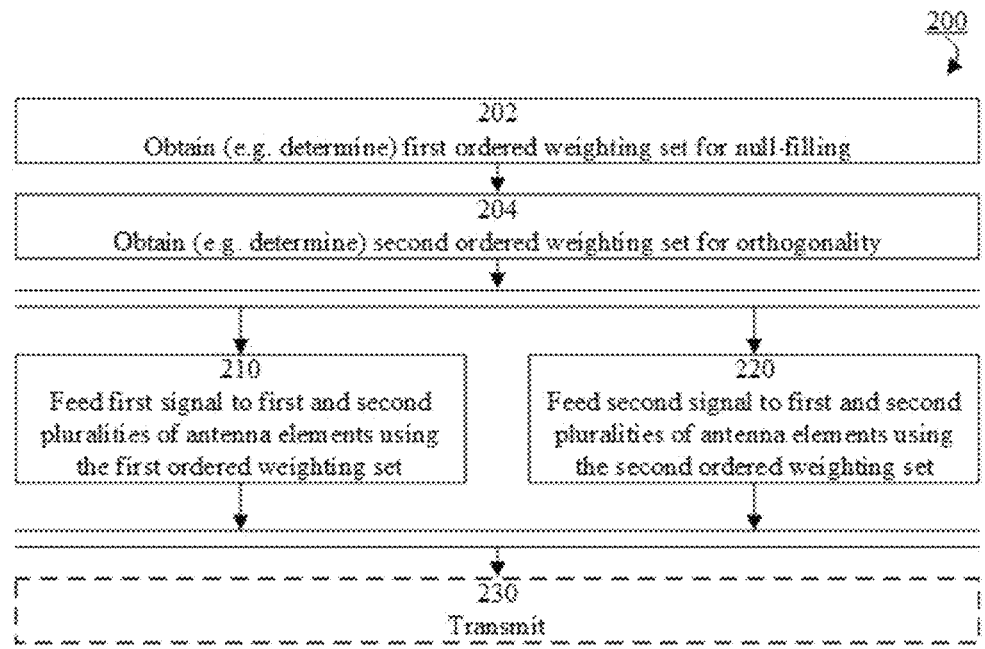
FIG. 2 is a flowchart illustrating example method steps according to some embodiments.

FIG. 2 illustrates an example method 200 of a signal distribution network according to some embodiments. The method 200 illustrated in FIG. 2 is suitable for a transmitter but may be adapted to be suitable for a receiver, as is easily realized by the skilled person and also briefly demonstrated in the following.

The signal distribution network performing the method 200 is configured to distribute first and second signals from (or to; in the receiver case) respective first and second antenna ports to (or from; in the receiver case) first and second pluralities of antenna elements via distribution nodes, wherein each of the distribution nodes is associated with at least one of the antenna elements.

Each antenna element has an antenna element orientation. Furthermore, each of the first and second pluralities of antenna elements are orderly arranged in an antenna array such that at least some of the antenna elements of the first plurality are co-located with corresponding ones of the antenna elements of the second plurality.

The method comprises obtaining a first ordered weighting set for null-filling as illustrated by step 202 and obtaining a second ordered weighting set for polarization orthogonality as illustrated by step 204. The first and/or second ordered weighting sets may be determined as part of the method. For example, the first and/or second ordered weighting sets may be determined by controlling circuitry comprised in, or otherwise associated with, the signal distribution network. Other ways of obtaining the first and/or second ordered weighting sets include receiving them via weighting set input ports, retrieving them from memory circuitry comprised in (or otherwise associated with) the signal distribution network, having them hardcoded into software of the signal distribution network, them being part of the hardware architecture of the signal distribution network, etc.

The first and second ordered weighting sets each comprises a (first and second)—zero valued or non-zero valued—weighting element for each distribution node. When a non-zero weighting element is combined with the antenna element orientation for the distribution node, a (first or second; depending on whether the non-zero weighting element is of the first or second ordered weighting set) signal contribution factor for first and second polarizations is provided.

To provide null-filling, the first ordered weighting set is constructed such that at least one of the first signal contribution factors differs from the other first signal contribution factors. Thus, the resulting first signal for transmission is composed by signals components with non-parallel polarization.

To provide polarization orthogonality, the second ordered weighting set is constructed such that:
the second signal contribution factor for the first polarization correspond to complex conjugates of the first signal contribution factor for the second polarization, in reverse order, and
the second signal contribution factor for the second polarization correspond to negated complex conjugates of the first signal contribution factor for the first polarization, in reverse order.

Generally, negation corresponds to a required phase shift of $\pi$ between the weights applied to first and second sets of distribution nodes.

Figure 1:
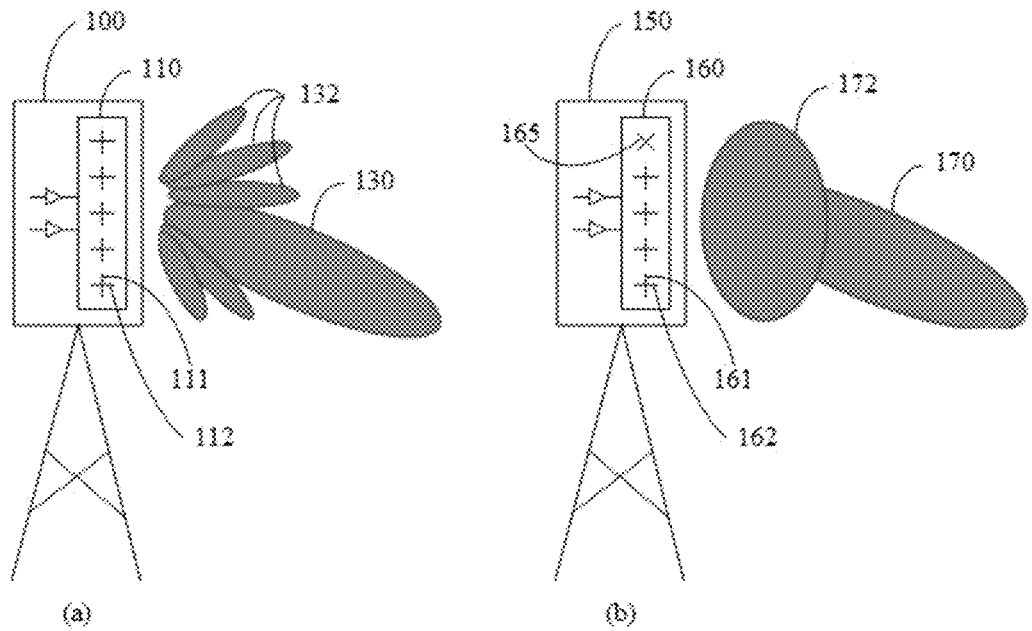
FIG. 1 is a schematic drawing illustrating example pluralities of antenna elements and example transmission patterns.
Figure 3:
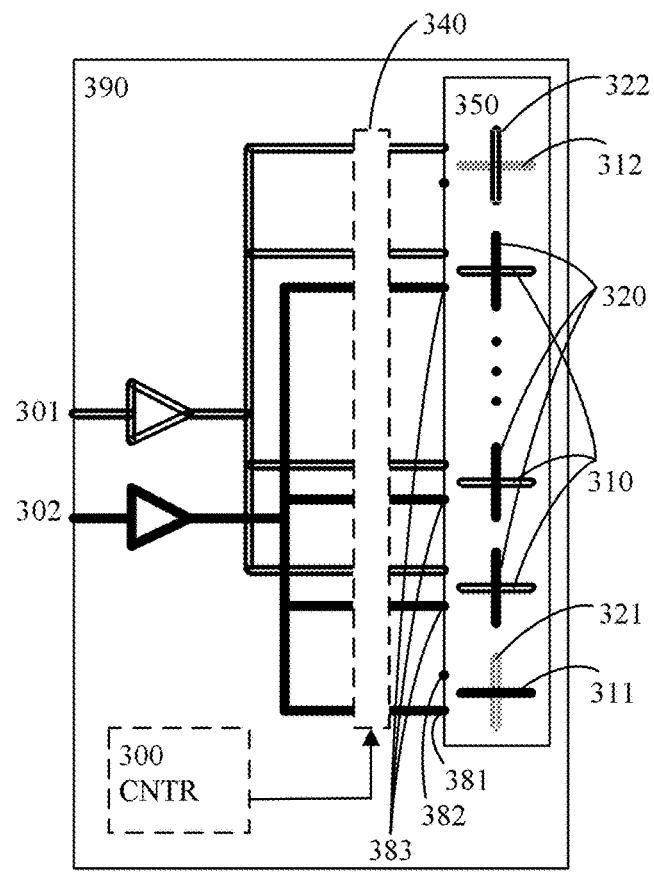
FIGS. 3-5 are schematic block diagrams illustrating example transmitter arrangements according to some embodiments.
Figure 5:
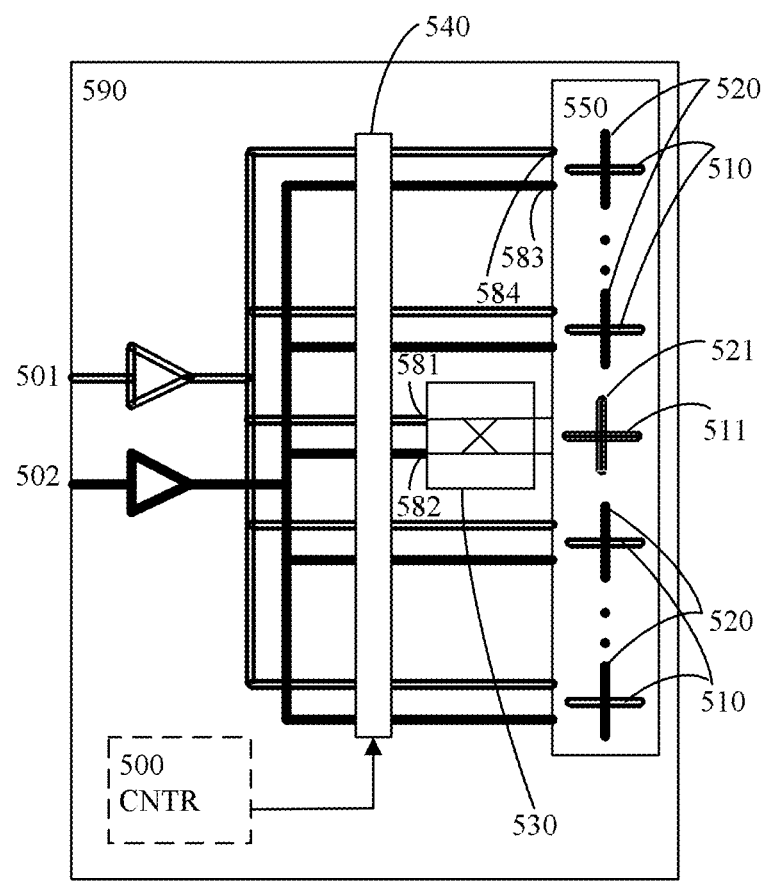

As will be exemplified in FIGS. 3 and 5, the first plurality of antenna elements may have a same first antenna element orientation and the second plurality of antenna elements may have a same second antenna element orientation, wherein the first and second antenna element orientations are orthogonal. One example of such an antenna element configuration is a conventional antenna array such as the antenna array 110 schematically illustrated in FIG. 1(a).

As will be exemplified in FIG. 3, wherein each distribution node is associated with exactly one of the antenna elements, null-filling and polarization orthogonality may, in such antenna element configurations, be provided by:
letting the first weighting elements of the distribution nodes of the antenna elements of the second plurality be zero, except for an antenna element of the second plurality at a second end of the antenna array, where the first weighting element has a non-zero value, and
letting each of the first weighting elements of the distribution nodes of the antenna elements of the first plurality have a respective non-zero value, except for antenna elements of the first plurality at the second end and a first end of the antenna array, which first weighting elements are zero.

As will be exemplified in FIG. 5, null-filling and polarization orthogonality may, in such antenna element configurations, alternatively be provided by letting the signal distribution network comprise a hybrid for a pair of antenna elements located in a center of the antenna array wherein each distribution node is associated with either exactly one of the antenna elements or exactly one hybrid node, letting the first weighting elements of the distribution nodes associated with exactly one of the antenna elements of the first plurality and the first weighting element of the distribution node associated with a first one of the hybrid nodes be zero, and letting each of the first weighting elements of the distribution nodes associated with exactly one of the antenna elements of the second plurality and the first weighting element of the distribution node associated with a second one of the hybrid nodes have a respective non-zero value, wherein the non-zero value of the first weighting element of the distribution node associated with the second one of the hybrid nodes is configured to compensate for the hybrid.

Figure 4:
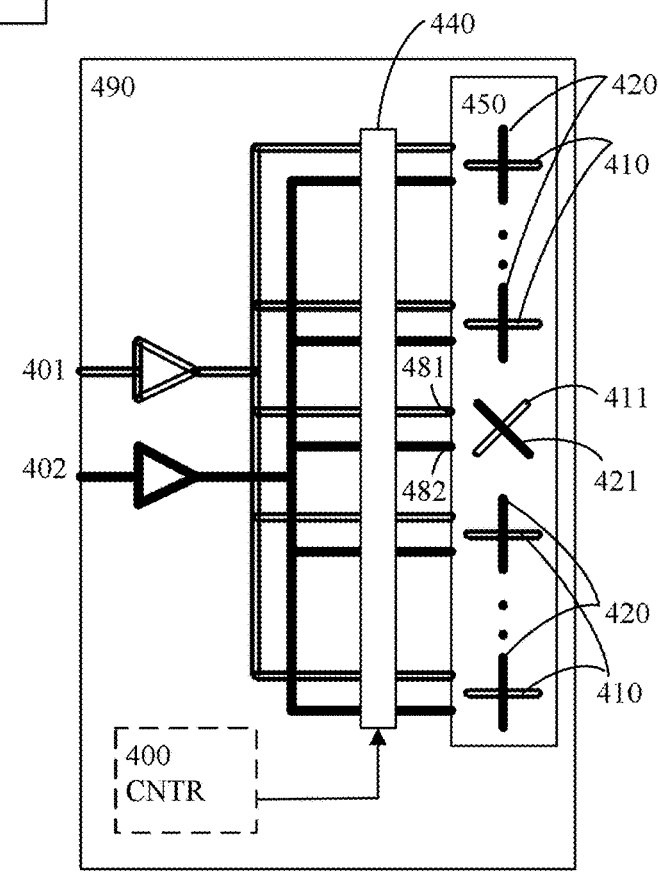

As will be exemplified in FIG. 4, wherein each distribution node is associated with exactly one of the antenna elements, null-filling and polarization orthogonality may alternatively be provided by adjusting the antenna element configuration described above such that, for a pair of antenna elements located in a center of the antenna array, the antenna element orientations of the pair are orthogonal (to each other) and rotated by a rotation angle relative the first and second antenna element orientations, respectively. Then, the first weighting elements of the distribution nodes of the antenna elements of the second plurality may be set to zero, and the first weighting elements of the distribution nodes of the antenna elements of the first plurality may have a respective non-zero value, wherein the non-zero value of the antenna element of the first plurality comprised in the pair located in the center of the antenna array is configured to compensate for the rotation angle. In this example, each of the antenna elements of the pair is sorted into first and second pluralities, respectively, even though that clearly have different orientations than the other antenna elements.

In steps 210 and 220, respectively, the first signal is fed to (or from; in the receiver case) the first and second pluralities of antenna elements via the distribution nodes and using the first ordered weighting set, and the second signal is fed to (or from; in the receiver case) the first and second pluralities of antenna elements via the distribution nodes and using the second ordered weighting set. As illustrated in FIG. 2, steps 210 and 220 are typically performed in parallel. As will be evident from the description of FIGS. 3-5, the feeding steps may be implemented in various ways including, but not limited to, using a predetermined wiring of the signal distribution network, scaling the first and/or second signal by the weighting elements for each/some of the antenna elements, passing the first and/or second signal through a hybrid for one/some of the antenna elements, etc.

In optional step 230, the first and second signals are transmitted via the first and second plurality of antenna elements. In the receiver case, the method might instead comprise a step (prior to steps 210 and 220) of receiving the first and second signals via the first and second plurality of antenna elements.

Generally, a signal distribution network for a wireless transmitter and/or receiver is provided according to various embodiments. Examples presented herein generally relate to transmission of signals. This is not to be construed as limiting, but merely illustrative. Thus, approaches described herein are equally applicable to reception of signals.

The signal distribution network is associated with first and second antenna ports and first and second pluralities of antenna elements, and configured to distribute first and second signals from respective ones of the first and second antenna ports to the first and second pluralities of antenna elements via distribution nodes, wherein each distribution node is associated with at least one of the antenna elements.

Each antenna element has an antenna element orientation. Furthermore, each of the first and second pluralities of antenna elements are orderly arranged in an antenna array such that at least some of the antenna elements of the first plurality are co-located with corresponding ones of the antenna elements of the second plurality.

The signal distribution network may comprise controlling circuitry (e.g. a controller, CNTR) configured to cause determination of first and second ordered weighting sets comprising respective first and second weighting elements for each distribution node. To this end, the controller may comprise or be otherwise associated with determination circuitry (e.g. a determiner) configured to determine the first and second ordered weighting sets.

The controlling circuitry may also be configured to cause feeding of the first signal to the first and second pluralities of antenna elements via the distribution nodes and using the first ordered weighting set and feeding of the second signal to the first and second pluralities of antenna elements via the distribution nodes and using the second ordered weighting set. To this end, the controller may comprise, or be otherwise associated with scaling circuitry (e.g. a scaling unit for each antenna element and/or for each of the first and second signals) configured to scale the first or second signal, as applicable, by the corresponding first or second weighting element before the signal is fed to the corresponding antenna element via the distribution nodes.

The first and second ordered weighting sets each comprises a—zero valued or non-zero valued—weighting element for each distribution node. When a non-zero valued (first or second) weighting element is combined with the antenna element orientation of the corresponding distribution node a (first or second) signal contribution factor for first and second polarizations is provided.

The determination of the first ordered weighting set comprises determining the non-zero valued first weighting elements such that at least one of the first signal contribution factors differs from the other first signal contribution factors. Thus, the resulting first signal for transmission is composed by signals components with non-parallel polarization. This feature provides null-filling of the transmission pattern.

For example, the first ordered weighting set may comprise a set $w_{1,A}$ of first weighting elements for a first set of distribution nodes (e.g. a set where each distribution node is associated with exactly one of the first plurality of antenna elements, or a set where each distribution node is associated with either exactly one of the first plurality of antenna elements or a first one of two hybrid nodes) and a set $w_{1,B}$ of first weighting elements for a second set of distribution nodes (e.g. a set where each distribution node is associated with exactly one of the second plurality of antenna elements, or a set where each distribution node is associated with either exactly one of the second plurality of antenna elements or a second one of the two hybrid nodes). When the first weighting elements are combined with the antenna element orientations for the corresponding distribution nodes, the sets $u_{1,A}$ and $u_{1,B}$ are provided. The sets $u_{1,A}$ and $u_{1,B}$ represent the first signal contribution factors for first, A, and second, B, polarizations and they may be seen as vectors describing an impact of the first signal in respective ones of the first, A, and second, B, orthogonal polarization. Each element in $u_{1,A}$ and $u_{1,B}$ is associated with a distribution node, and thereby also associated with an antenna element or a pair of co-located antenna elements. The determination of the second ordered weighting set comprises determining the second weighting elements such that the second signal contribution for the first polarization correspond to complex conjugates of the first signal contribution for the second polarization, in reverse order.

The determination of the second ordered weighting set also comprises determining the second weighting elements such that the second signal contribution for the second polarization correspond to negated complex conjugates of the first signal contribution for the first polarization, in reverse order.

These features aim towards providing beam patterns for the first and second signals (of the first and second ports, respectively) which have identical power pattern and orthogonal polarization. These are general requirements which may be applicable according to the principles presented herein; that the weighting sets provide orthogonal polarization and identical power patterns for the first and second signals.

Continuing the example above, the second ordered weighting set will comprise a set $w_{2,A}$ of second weighting elements for the first set of distribution nodes and a set $w_{2,B}$ of second weighting elements the second set of distribution nodes, which when combined with the antenna element orientations for the corresponding distribution nodes provides the sets $u_{2,A}$ and $u_{2,B}$. The sets $u_{2,A}$ and $u_{2,B}$ represent the second signal contribution factors for first, A, and second, B, polarizations and they may be seen as vectors describing an impact of the second signal in respective ones of the first, A, and second, B, orthogonal polarization. Each element in $u_{2,A}$ and $u_{2,B}$ is associated with a distribution node, and thereby also associated with an antenna element or a pair of co-located antenna elements. The second ordered weighting set $w_{2,A}$, $w_{2,B}$ should be chosen such that $u_{2,A}=\mathrm{rev}(u_{1,B}^*)$ and $u_{2,B}=-\mathrm{rev}(u_{1,A}^*)$, where rev(•) denotes reversion of the order of elements in a set.

For example, the signal distribution network may be comprised in a wireless transmitter, for example, a wireless transmitter comprised in a network node. Typically, the antenna array may also be comprised in the transmitter.

This general signal distribution network will now be exemplified by three different example transmitter arrangements illustrated in FIGS. 3-5.

FIG. 3 illustrates an example signal distribution network for a wireless transmitter 390 according to a first example. The signal distribution network is associated with a first antenna port 301 and a second antenna port 302. The signal distribution network is also associated with a first plurality of antenna elements 310, 311, 312 and a second plurality of antenna elements 320, 321, 322. The signal distribution network is configured to distribute first and second signals from respective ones of the first and second antenna ports 301, 302 to the first and second pluralities of antenna elements.

Each antenna element has an antenna element orientation, and each of the first and second pluralities of antenna elements are orderly arranged in an antenna array 350 such that at least some of the antenna elements of the first plurality are co-located with corresponding ones of the antenna elements of the second plurality. In this example each antenna element of the first plurality is co-located with an antenna element of the second plurality according to some embodiments. In other embodiments (where the first and second plurality are offset to each other) each antenna element of the first plurality is co-located with an antenna element of the second plurality, except for the antenna elements at a first and second end of the antenna array as will be elaborated on later on.

In the example of FIG. 3, the first plurality of antenna elements 310, 311, 312 have a same first antenna element orientation (a "vertical" orientation) and the second plurality of antenna elements 320, 321, 322 have a same second antenna element orientation (a "horizontal" orientation), wherein the first and second antenna element orientations are orthogonal to each other.

As will be seen in the following, null-filling and polarization orthogonality are achieved in this example by feeding the first and second signals to the antenna array using the first and second weighting sets, chosen properly.

The first signal is fed from the first antenna port 301 to all of the first antenna elements 310, except for the first antenna element 311 at a first end of the antenna array and except for the first antenna element 312 at a second end of the antenna array. At the first end of the antenna array, the first signal is not fed to any antenna element 311, 321 at all. At the second end of the antenna array, the first signal is fed to an antenna element 322 of the second plurality.

The second signal is fed from the second antenna port 302 to all of the second antenna elements 320, except for the second antenna element 321 at the first end of the antenna array and except for the second antenna element 322 at the second end of the antenna array. At the first end of the antenna array, the second signal is fed to an antenna element 311 of the first plurality. At the second end of the antenna array, the second signal is not fed to any antenna element 312, 322 at all.

Since antenna elements 321 and 312 are not fed any signal at all, these antenna elements may be omitted completely (which may also be seen as the antenna elements of one antenna element orientation being offset by one element compared to the antenna elements of the other antenna element orientation). Alternatively, antenna elements 321 and 312 may be present in the antenna array but not used in the set-up presented in FIG. 3. The latter may be seen as a more flexible architecture.

Null-filling is achieved because each signal is fed to antenna elements of different antenna element orientation, and polarization orthogonality is achieved since the antenna element orientation differences are symmetrically spread along the antenna array, with the second ordered weighting set properly chosen as explained above. Other alternatives than that illustrated in Figured 3 exist that achieves these advantages. For example, the antenna element pairs 312, 322 and 311, 321 might be placed somewhere else than at the first and second ends of the antenna array; as long as they are placed symmetrically.

In FIG. 3, the feeding of the first and second signals to the first and seconds pluralities of antenna elements is illustrated by signal connections where the respective signal is fed to an antenna element and absence of signal connection where the respective signal is not fed to an antenna element. Generally, this effect may be achieved by having signal connections from each antenna port to each antenna element of the first and second pluralities and applying zero-valued scaling factors where the respective signal is not to be fed to an antenna element. The latter may be seen as a more flexible architecture, and is indicated in FIG. 3 by controlling circuitry 300 and scaling circuitry 340.

Connecting to the general description above, the example of FIG. 3 would manifest itself as explained in the following.

The first and second ordered weighting sets each comprises a—zero valued or non-zero valued—first and second weighting element for each distribution node, to be used for feeding of the first and second signal to the first and second pluralities of antenna elements. In this example, each distribution node is associated with exactly one of the antenna elements. For example, the distribution node 381 is associated with antenna element 311, the distribution node 382 is associated with the antenna element 321, each of the distribution nodes 383 is associated with a respective one of the antenna elements 320, and so on. Thus, in this example, the first and second ordered weighting sets may be said to each comprise a—zero valued or non-zero valued—first and second weighting element for each antenna element of the first and second plurality.

For example, the first ordered weighting set may comprise a set $[w_{1,A}, w_{1,B}]=[0,1, \ldots, 1,0; 1,0, \ldots 0,0]$ of first weighting elements for the first and second plurality of antenna elements.

The first half of this set corresponds to the first signal being fed from the first antenna port 301 to all of the first antenna elements of the first plurality, except for the first antenna element 311 at a first end of the antenna array and except for the first antenna element 312 at a second end of the antenna array; i.e., the first signal being fed from the first antenna port to the first antenna elements 310 of the first plurality. Thus, the first weighting elements of the antenna elements of the first plurality equals a (same) first value, except for antenna elements of the first plurality at first and second ends of the antenna array, which first weighting elements are zero.

The second half of this set corresponds to the first signal being fed to an antenna element 322 of the second plurality at the second end of the antenna array. Thus, the first weighting elements of the antenna elements of the second plurality are zero, except for an antenna element of the second plurality at a second end of the antenna array, where the first weighting element has the first value.

Generally, each of the non-zero first weighting elements may have any complex value (equal to, or different from, other ones of the non-zero first weighting elements) suitably chosen to achieve desired properties of the transmission power pattern.

In this example, the second ordered weighting set may comprise a set $[w_{2,A}, w_{2,B}]=[0,0, \ldots, 0,1; 0,-1, \ldots -1,0]$ of second weighting elements for the first and second plurality of antenna elements.

The second half of this set corresponds to the second signal being fed from the second antenna port 302 to all of the second antenna elements of the second plurality, except for the second antenna element 321 at a first end of the antenna array and except for the second antenna element 322 at a second end of the antenna array; i.e., the second signal being fed from the second antenna port to the second antenna elements 320 of the second plurality. The first half of this set corresponds to the second signal being fed to an antenna element 311 of the first plurality at the first end of the antenna array.

Generally, each of the non-zero second weighting elements may have any complex value (equal to, or different from, other ones of the non-zero second weighting elements) suitably chosen to achieve desired properties of the transmission power pattern and to achieve polarization orthogonality.

It is easily seen in FIG. 3 that when the non-zero valued weighting elements are combined with the antenna element orientation of the corresponding distribution node (i.e., of the corresponding antenna element in this example), one of the signal contribution factors for the polarizations for the first signal (i.e., for the first antenna port) differs from the other signal contribution factors for the polarizations for the first signal, namely that of antenna element 322, and correspondingly for the second signal (i.e., for the second signal port). It is also easily seen that $[u_{2,A}, u_{2,B}]=[\text{rev}(u_{1,B}^*), -\text{rev}(u_{1,A}^*)]$.

The gain drop of the main lobe due to the example illustrated in FIG. 3 can in most practical situations be neglected since the (relative) power required to fill out the nulls to a significant level (typically 20-25 dB below the main lobe peak) is very small. For example, if the antenna array has 14 elements in each of the sets 310 and 320, with uniform amplitude taper (each antenna element transmits with the same power), the gain drop for the main lobe is −0.3 dB.

FIG. 4 illustrates an example signal distribution network for a wireless transmitter 490 according to a second example. The signal distribution network is associated with a first antenna port 401 and a second antenna port 402. The signal distribution network is also associated with a first plurality of antenna elements 410, 411 and a second plurality of antenna elements 420, 421. The signal distribution network is configured to distribute first and second signals from respective ones of the first and second antenna ports 401, 402 to the first and second pluralities of antenna elements.

Each antenna element has an antenna element orientation, and each of the first and second pluralities of antenna elements are orderly arranged in an antenna array 450 such that at least some of the antenna elements of the first plurality are co-located with corresponding ones of the antenna elements of the second plurality. In this example each antenna element of the first plurality is collocated with an antenna element of the second plurality.

In the example of FIG. 4, all but one of the first plurality of antenna elements 410 have a same first antenna element orientation (a "vertical" orientation) and all but one of the second plurality of antenna elements 420 have a same second antenna element orientation (a "horizontal" orientation), wherein the first and second antenna element orientations are orthogonal to each other. The exception comprises an antenna element pair (one antenna element from the first plurality and one antenna element from the second plurality) in the center of the antenna array, which are rotated by $\pi/4$ relative the other pairs. Generally, any rotation angle (which is not a multiple of $\pi$) may be used provided the weighting elements are chosen accordingly, and the antenna element orientations of the antenna elements of the pair are orthogonal to each other. Thus, except for a pair of antenna elements 411, 421 located in a center of the antenna array, the first plurality of antenna elements 410 have a same first antenna element orientation and the second plurality of antenna elements 420 have a same second antenna element orientation, wherein the first and second antenna element orientations are orthogonal.

For the pair 411, 421 of antenna elements located in the center of the antenna array, the antenna element orientations of the pair are orthogonal and rotated by a rotation angle relative the first and second antenna element orientations, respectively.

As will be seen in the following, null-filling and polarization orthogonality are achieved in this example by feeding the first and second signals to the antenna array using the first and second weighting sets, chosen properly.

The first signal is fed from the first antenna port 401 to all of the first antenna elements 410, 411. Furthermore, the first signal is not fed to any antenna element at all of the second plurality.

The second signal is fed from the second antenna port 402 to all of the second antenna elements 420, 421. Furthermore, the second signal is not fed to any antenna element at all of the first plurality.

Null-filling is achieved because of the deviating antenna element orientation of the antenna element pair 411, 421, and polarization orthogonality is achieved since the antenna element orientation deviation is symmetrically spread along the antenna array (the pair 411, 421 being the center elements of the antenna array), with the second ordered weighting set properly chosen as explained above. Other alternatives than that illustrated in Figured 4 exist that achieves these advantages. For example, antenna element pairs having deviating antenna element orientation might be placed somewhere else than at the center of the antenna array; as long as they are placed symmetrically. Typically, desirable beam pattern properties are achieved if the antenna element pairs having deviating antenna element orientation are close to each other; which together with the symmetry condition indicates that the center of the antenna array is a good choice. If the antenna array has an even number of antenna element pairs, the two pairs in the center of the antenna array may be implemented with deviating antenna element orientation.

In FIG. 4, the feeding of the first and second signals to the first and seconds pluralities of antenna elements is illustrated by signal connections where the respective signal is fed to an antenna element and absence of signal connection where the respective signal is not fed to an antenna element. Generally, this effect may be achieved by having signal connections from each antenna port to each antenna element of the first and second pluralities and applying zero-valued scaling factors where the respective signal is not to be fed to an antenna element. The latter may be seen as a more flexible architecture.

Generally, in examples such as that of FIG. 4, the antenna element pair(s) having deviating antenna element orientation is preferably assigned a weighting element different from the weighting elements of the other antenna elements. This effect may be achieved by applying corresponding scaling factors to the respective signal when fed to an antenna element. This is indicated in FIG. 4 by scaling circuitry 440, which may optionally be controlled by controlling circuitry 400.

Connecting to the general description above, the example of FIG. 4 would manifest itself as explained in the following.

The first and second ordered weighting sets each comprises a—zero valued or non-zero valued—first and second weighting element for each distribution node, to be used for feeding of the first and second signal to the first and second pluralities of antenna elements. In this example, each distribution node is associated with exactly one of the antenna elements. For example, the distribution node 481 is associated with antenna element 411, the distribution node 482 is associated with the antenna element 421, and so on. Thus, in this example, the first and second ordered weighting sets may be said to each comprise a—zero valued or non-zero valued—first and second weighting element for each antenna element of the first and second plurality.

For example, the first ordered weighting set may comprise a set $[w_{1,A}, w_{1,B}]=[1, \ldots, 1, \sqrt{2}, 1, \ldots, 1; 0,0, \ldots 0,0]$ of first weighting elements for the first and second plurality of antenna elements.

The first half of this set corresponds to the first signal being fed from the first antenna port 401 to all of the first antenna elements 410, 411 of the first plurality. The second half of this set corresponds to the first signal not being fed to any antenna element of the second plurality.

Thus, the first weighting elements of the antenna elements of the first plurality have a same first value, except for the antenna element of the first plurality comprised in the pair located in the center of the antenna array, which first weighting element equals the first value adjusted to compensate for the rotation angle ($\sqrt{2}$ to compensate for rotation angle of $\pi/4$), and the first weighting elements of the antenna elements of the second plurality are zero.

Generally, each of the non-zero first weighting elements may have any complex value (equal to, or different from, other ones of the non-zero first weighting elements) suitably chosen to achieve desired properties of the transmission power pattern, wherein the non-zero first weighting element for the pair is compensated for the rotation angle.

In this example, the second ordered weighting set may comprise a set $[w_{2,A}, w_{2,B}] = [0,0, \ldots, 0,0; -1, \ldots, -1, -1, \ldots, -1]$ of second weighting elements for the first and second plurality of antenna elements. The second half of this set corresponds to the second signal being fed from the second antenna port 402 to all of the second antenna elements 420, 421 of the second plurality. The first half of this set corresponds to the second signal not being fed to any antenna element of the first plurality.

Generally, each of the non-zero second weighting elements may have any complex value (equal to, or different from, other ones of the non-zero second weighting elements) suitably chosen to achieve desired properties of the transmission power pattern, wherein the non-zero second weighting element for the pair is compensated for the rotation angle, and to achieve polarization orthogonality.

It is easily seen in FIG. 4 that when the non-zero valued weighting elements are combined with the antenna element orientation of the corresponding distribution node (i.e., of the corresponding antenna element in this example), one of the signal contribution factors for the polarizations for the first signal (i.e., for the first antenna port) differs from the other signal contribution factors for the polarizations for the first signal, namely that of antenna element 411, and correspondingly for the second signal (i.e., for the second signal port).

FIG. 5 illustrates an example signal distribution network for a wireless transmitter 590 according to a third example. The signal distribution network is associated with a first antenna port 501 and a second antenna port 502. The signal distribution network is also associated with a first plurality of antenna elements 510, 511 and a second plurality of antenna elements 520, 521. The signal distribution network is configured to distribute first and second signals from respective ones of the first and second antenna ports 501, 502 to the first and second pluralities of antenna elements.

Each antenna element has an antenna element orientation, and each of the first and second pluralities of antenna elements are orderly arranged in an antenna array 550 such that at least some of the antenna elements of the first plurality are co-located with corresponding ones of the antenna elements of the second plurality. In this example each antenna element of the first plurality is collocated with an antenna element of the second plurality.

In the example of FIG. 5, the first plurality of antenna elements 510, 511 have a same, first antenna element orientation (a "vertical" orientation) and the second plurality of antenna elements 510, 511 have a same second antenna element orientation (a "horizontal" orientation), wherein the first and second antenna element orientations are orthogonal to each other.

As will be seen in the following, null-filling and polarization orthogonality are achieved in this example by feeding the first and second signals to the antenna array using a hybrid and the first and second weighting sets, chosen properly.

For the pair 511, 521 of antenna elements located in the center of the antenna array, each of the first and second signals are fed to both of the antenna elements of the pair via a so called hybrid 530. This has the same effect as achieved in the example of FIG. 4 by rotation of the orientations of the pair of antenna elements located in the center of the antenna array.

A hybrid (or a hybrid coupler) is a device well known in the art. Generally, it may have two inputs and two outputs (i.e., four hybrid nodes), and be configured to provide the signal of the first input to both the first and second outputs and to provide the signal of the second input to both the first and second outputs.

A typical hybrid that is usable in the example of FIG. 5 is a $\pi$-hybrid (i.e., a 180°-hybrid). Such a hybrid is configured to provide the first signal (from the first input) to a first antenna element of the pair (via the first output) at a first signal input phase and provide the second signal (from the second input) to the first antenna element of the pair (via the first output) at a second signal input phase. It is also configured to provide the first signal (from the first input) to a second antenna element of the pair (via the second output) at the first signal input phase and provide the second signal (from the second input) to the second antenna element of the pair (via the second output) at the second signal input phase plus $\pi$. The transfer function of such a hybrid might be expressed as $$\frac{1}{\sqrt{2}}\begin{bmatrix} 1 & 1 \\ 1 & -1 \end{bmatrix}.$$

The first signal is fed from the first antenna port 501 to all of the first antenna elements 510, 511. Furthermore, the first signal is fed to the antenna element 521 of the second plurality. The second signal is fed from the second antenna port 502 to all of the second antenna elements 520, 521. Furthermore, the second signal is fed to the antenna element 511 of the first plurality. Feeding of the first and second signals to the antenna element pair 511, 521 is via the hybrid 530.

Null-filling is achieved due to power summation of the orthogonal orientations, including the antenna element pair 511, 521 in the power summation, and polarization orthogonality is achieved since the hybrid is symmetrically placed in the antenna array (in the center element of the antenna array), with the second ordered weighting set properly chosen as explained above. Other alternatives than that illustrated in Figured 5 exist that achieves these advantages. For example, hybrids might be placed somewhere else than at the center of the antenna array; as long as they are placed symmetrically. Typically, desirable beam pattern properties are achieved if the hybrids are close to each other; which together with the symmetry condition indicates that the center of the antenna array is a good choice. If the antenna array has an even number of antenna element pairs, the two pairs in the center of the antenna array may be associated with respective hybrids.

In FIG. 5, the feeding of the first and second signals to the first and seconds pluralities of antenna elements is illustrated by signal connections where the respective signal is fed to an antenna element and absence of signal connection where the respective signal is not fed to an antenna element. Generally, this effect may be achieved by having signal connections from each antenna port to each antenna element of the first and second pluralities and applying zero-valued scaling factors where the respective signal is not to be fed to an antenna element. The latter may be seen as a more flexible architecture.

Generally, in examples such as that of FIG. 5, the distribution nodes 581, 582 associated with nodes of the hybrid is preferably assigned a weighting element different from the weighting elements of the other distribution nodes 583, 584. This effect may be achieved by applying corresponding scaling factors to the respective signal when fed to a distribution node. This is indicated in FIG. 5 by scaling circuitry 540, which may optionally be controlled by controlling circuitry 500.

Connecting to the general description above, the example of FIG. 5 would manifest itself as explained in the following.

The first and second ordered weighting sets each comprises a—zero valued or non-zero valued—first and second weighting element for each distribution node, to be used for feeding of the first and second signal to the first and second pluralities of antenna elements. In this example, each distribution node is associated with either exactly one of the antenna elements (e.g., distribution nodes 583, 584) or exactly one hybrid node (distribution nodes 581, 582).

For example, the first ordered weighting set may comprise a set $[w_{1,A}, w_{1,B}]=[1, \ldots, 1, \sqrt{2}, 1, \ldots, 1; 0, 0, \ldots 0, 0]$ of first weighting elements for the distribution nodes.

The first half of this set corresponds to the first signal being fed from the first antenna port 501 to a first set of distribution nodes; and thereby to the first antenna elements 510 of the first plurality, and to the first input of the hybrid 530 (i.e., the distribution node 581 is associated with a first one of the hybrid nodes; the first input of the hybrid). Via the hybrid, the first signal is fed to both antenna element 511 of the first plurality and antenna element 521 of the second plurality. The second half of this set corresponds to the first signal not being fed to a second set of distribution nodes; and thereby not to antenna elements 520 of the second plurality, and not to the second input of the hybrid.

Thus, the first weighting elements of the first set of distribution nodes have a same first value, except for the distribution node of the first set associated with the hybrid node, which first weighting element equals the first value adjusted to compensate for the hybrid transfer function rotation, and the first weighting elements of the second set of distribution nodes are zero.

Generally, each of the non-zero first weighting elements may have any complex value (equal to, or different from, other ones of the non-zero first weighting elements) suitably chosen to achieve desired properties of the transmission power pattern, wherein the non-zero first weighting element for the pair is compensated for the hybrid.

In this example, the second ordered weighting set may comprise a set $[w_{2,A}, w_{2,B}]=[0, 0, \ldots, 0, 0; 1, \ldots, 1, \sqrt{2}, 1, \ldots, 1]$ of second weighting elements for the distribution nodes.

The second half of this set corresponds to the second signal being fed from the second antenna port 502 to the second set of distribution nodes; and thereby to the second antenna elements 520 of the second plurality, and to the second input of the hybrid 530 (i.e., the distribution node 582 is associated with a second one of the hybrid nodes; the second input of the hybrid). Via the hybrid, the second signal is fed to both antenna element 511 of the first plurality and antenna element 521 of the second plurality. The first half of this set corresponds to the second signal not being fed to the first set of distribution nodes; and thereby not to antenna elements 510 of the first plurality, and not to the first input of the hybrid. The required negation for the second part of the u-vector does not propagate to the w-vector since it is implemented by the hybrid.

Generally, each of the non-zero second weighting elements may have any complex value (equal to, or different from, other ones of the non-zero second weighting elements) suitably chosen to achieve desired properties of the transmission power pattern, wherein the non-zero second weighting element for the pair is compensated for the hybrid, and to achieve polarization orthogonality.

Typically, as illustrated in FIG. 5, the first and second weighting elements are applied at 540 prior to the hybrid 530, the first and second weighting elements of the distribution nodes 581, 582 thereby affecting both antenna elements of the pair 511, 521.

It is easily seen in FIG. 5 that when the non-zero valued weighting elements are combined with the antenna element orientation for the corresponding distribution node, one of the polarizations for the first signal (i.e., for the first antenna port) differs from the other polarizations for the first signal, namely that of antenna elements 511, 512, and correspondingly for the second signal (i.e., for the second signal port). In this example, the antenna element orientation for each of the distribution nodes 581, 582 may be expressed as the orientations of both the antenna elements 511, 521, taking the effect of the hybrid into account.

The hybrid is preferably a 180°-hybrid. Assuming the transfer function above and that the first and second weighting elements for the hybrid affected pair of antenna elements are $[\alpha\ 0]$ and $[0\ \beta]$, respectively, the excitation of the antenna elements of the pair becomes $[\alpha\ \alpha]/\sqrt{2}$ for the first signal and $[-\beta\ \beta]/\sqrt{2}$ for the second signal. When $-\beta = -\alpha^*$ and $\beta = \alpha^*$ polarization orthogonality is provided between the first and second antenna ports.

Generally, a desired beam shape is given by the u-vectors for each of the first and second signals, and then the w-vectors are calculated based on the signal distribution network (including, e.g., hybrids and/or rotation angles of one or more antenna elements).

Although the drawings are based on a classical antenna design with two ports and two power amplifiers, it should be noted that the same principals are applicable also for active antennas; or active antenna arrays.

Generally, when an arrangement is referred to herein, it is to be understood as a physical product; e.g., an apparatus. The physical product may comprise one or more parts, such as controlling circuitry in the form of one or more controllers, one or more processors, or the like.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a wireless communication device or a network node.

Embodiments may appear within an electronic apparatus (such as a wireless communication device or a network node) comprising arrangements, circuitry, and/or logic according to any of the embodiments described herein. Alternatively or additionally, an electronic apparatus (such as a wireless communication device or a network node) may be configured to perform methods according to any of the embodiments described herein.

Figure 6:
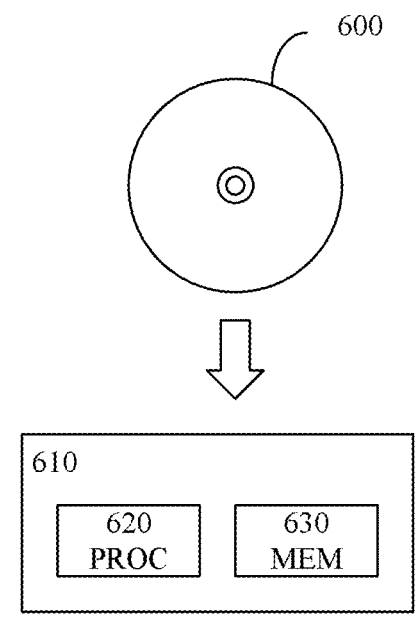
FIG. 6 is a schematic drawing illustrating an example computer readable medium according to some embodiments.

According to some embodiments, a computer program product comprises a computer readable medium such as, for example a universal serial bus (USB) memory, a plug-in card, an embedded drive or a read only memory (ROM). FIG. 6 illustrates an example computer readable medium in the form of a compact disc (CD) ROM 600. The computer readable medium has stored thereon a computer program comprising program instructions. The computer program is loadable into a data processor (PROC) 620, which may, for example, be comprised in a wireless communication device or a network node 610. When loaded into the data processing unit, the computer program may be stored in a memory (MEM) 630 associated with or comprised in the data-processing unit. According to some embodiments, the computer program may, when loaded into and run by the data processing unit, cause execution of method steps according to, for example, any of the methods illustrated in FIG. 2 or otherwise described herein.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiment, and vice versa.

Hence, it should be understood that the details of the described embodiments are merely examples brought forward for illustrative purposes, and that all variations that fall within the scope of the claims are intended to be embraced therein.

The invention claimed is:

1. A method of a signal distribution network configured to distribute first and second signals from, or to, respective first and second antenna ports to, or from, first and second pluralities of antenna elements via distribution nodes, wherein each distribution node is associated with at least one of the antenna elements, wherein each antenna element has an antenna element orientation, and wherein each of the first and second pluralities of antenna elements are orderly arranged in an antenna array such that at least some of the antenna elements of the first plurality are co-located with corresponding ones of the antenna elements of the second plurality, the method comprising:

obtaining a first ordered weighting set comprising a first—zero valued or non-zero valued—weighting element for each distribution node,
  each non-zero valued first weighting element being configured to provide first signal contribution factors for first and second polarizations when combined with the antenna element orientation for the distribution node, wherein at least one of the first signal contribution factors differs from the other first signal contribution factors;

obtaining a second ordered weighting set comprising a second weighting element for each distribution node,
  each non-zero valued second weighting element being configured to provide second signal contribution factors for the first and second polarizations when combined with the antenna element orientation for the distribution node,
  wherein the second signal contribution factors for the first polarization correspond to complex conjugates of the first signal contribution factors for the second polarization, in reverse order, and
  wherein the second signal contribution factors for the second polarization correspond to negated complex conjugates of the first signal contribution factors for the first polarization, in reverse order;

feeding the first signal to, or from, the first and second pluralities of antenna elements via the distribution nodes using the first ordered weighting set; and feeding the second signal to, or from, the first and second pluralities of antenna elements via the distribution nodes using the second ordered weighting set, wherein the first plurality of antenna elements have a same first antenna element orientation and the second plurality of antenna elements have a same second antenna element orientation, and wherein the first and second antenna element orientations are orthogonal, wherein each distribution node is associated with exactly one of the antenna elements, wherein the first weighting elements of the distribution nodes of the antenna elements of the second plurality are zero, except for an antenna element of the second plurality at a second end of the antenna array where the first weighting element has a non-zero value, and wherein each of the first weighting elements of the distribution nodes of the antenna elements of the first plurality has a respective non-zero value, except for antenna elements of the first plurality at the second end and a first end of the antenna array where the first weighting elements are zero.

2. The method of claim 1, wherein the signal distribution network comprises a hybrid for a pair of antenna elements located in a center of the antenna array, the hybrid being configured to:

provide the fed first signal to, or from, a first antenna element of the pair at a first signal input phase and provide the fed second signal to, or from, the first antenna element of the pair at a second signal input phase; and provide the fed first signal to, or from, a second antenna element of the pair at the first signal input phase and provide the fed second signal to, or from, the second antenna element of the pair at the second signal input phase plus $\pi$.

3. The method of claim 2, wherein each distribution node is associated with either exactly one of the antenna elements or exactly one hybrid node comprised by the hybrid,
   wherein the antenna elements of the pair reside on an output side of the hybrid and the first and second weighting elements are applied at an input side of the hybrid, the first and second weighting elements of the antenna elements of the pair thereby affecting both antenna elements of the pair,
   wherein the first weighting elements of the distribution nodes associated with exactly one of the antenna elements of the first plurality and the first weighting element of the distribution node associated with a first one of the hybrid nodes are zero, and
   wherein each of the first weighting elements of the distribution nodes associated with exactly one of the antenna elements of the second plurality and the first weighting element of the distribution node associated with a second one of the hybrid nodes has a respective non-zero value, wherein the non-zero value of the first weighting element of the distribution node associated with the second one of the hybrid nodes is configured to compensate for the hybrid.

4. The method of claim 1, wherein, except for a pair of antenna elements located in a center of the antenna array, the first plurality of antenna elements have a same first antenna element orientation and the second plurality of antenna elements have a same second antenna element orientation, wherein the first and second antenna element orientations are orthogonal, and
   wherein, for the pair of antenna elements located in the center of the antenna array, the antenna element orientations of the pair are orthogonal and rotated by a rotation angle relative to the first and second antenna element orientations, respectively.

5. The method of claim 4, wherein each distribution node is associated with exactly one of the antenna elements,
   wherein the first weighting elements of the distribution nodes of the antenna elements of the second plurality are zero, and
   wherein the first weighting elements of the distribution nodes of the antenna elements of the first plurality have a respective non-zero value, wherein the non-zero value of the antenna element of the first plurality comprised in the pair located in the center of the antenna array is configured to compensate for the rotation angle.

6. A computer program product comprising a non-transitory computer readable medium, having thereon a computer program comprising program instructions, the computer program being loadable into a data processing unit and configured to cause execution of the method according to claim 1 when the computer program is run by the data processing unit.

7. A signal distribution network for a wireless transmitter or receiver, the signal distribution network comprising first and second antenna ports and first and second pluralities of antenna elements, and configured to distribute first and second signals from, or to, respective ones of the first and second antenna ports to, or from, the first and second pluralities of antenna elements via distribution nodes, wherein each distribution node is associated with at least one of the antenna elements,
   wherein each antenna element has an antenna element orientation, and wherein each of the first and second pluralities of antenna elements are orderly arranged in an antenna array such that at least some of the antenna elements of the first plurality are co-located with corresponding ones of the antenna elements of the second plurality, the signal distribution network configured to cause:
feeding of the first signal to, or from, the first and second pluralities of antenna elements via the distribution nodes using a first ordered weighting set comprising a first weighting element for each antenna element; and
feeding of the second signal to, or from, the first and second pluralities of antenna elements via the distribution nodes using a second ordered weighting set comprising a second weighting element for each antenna element,
the first ordered weighting set comprising a first—zero valued or non-zero valued—weighting element for each distribution node,
   each non-zero valued first weighting element being configured to provide first signal contribution factors for first and second polarizations when combined with the antenna element orientation for the distribution node, wherein at least one of the first signal contribution factors differs from the other first signal contribution factors; and
the second ordered weighting set comprising a second weighting element for each distribution node,
   each non-zero valued second weighting element being configured to provide second signal contribution factors for the first and second polarizations when combined with the antenna element orientation for the distribution node,
   wherein the second signal contribution factors for the first polarization correspond to complex conjugates of the first signal contribution factors for the second polarization, in reverse order,
   wherein the second signal contribution factors for the second polarization correspond to negated complex conjugates of the first signal contribution factors for the first polarization, in reverse order,
wherein the first plurality of antenna elements have a same first antenna element orientation and the second plurality of antenna elements have a same second antenna element orientation, and wherein the first and second antenna element orientations are orthogonal,
wherein each distribution node is associated with exactly one of the antenna elements,
wherein the first weighting elements of the distribution nodes of the antenna elements of the second plurality are zero, except for an antenna element of the second plurality at a second end of the antenna array, where the first weighting element has a non-zero value, and
   wherein each of the first weighting elements of the distribution nodes of the antenna elements of the first plurality has a respective non-zero value, except for antenna elements of the first plurality at the second end and a first end of the antenna array which first weighting elements are zero.

8. The signal distribution network of claim 7,
wherein, except for a pair of antenna elements located in a center of the antenna array, the first plurality of antenna elements have a same first antenna element orientation and the second plurality of antenna elements have a same second antenna element orientation,
wherein the first and second antenna element orientations are orthogonal, and
   wherein, for the pair of antenna elements located in the center of the antenna array, the antenna element orientations of the pair are orthogonal and rotated by a rotation angle relative to the first and second antenna element orientations, respectively.

9. The signal distribution network of claim 8, wherein each distribution node is associated with exactly one of the antenna elements,
   wherein the first weighting elements of the distribution nodes of the antenna elements of the second plurality are zero, and
   wherein each of the first weighting elements of the distribution nodes of the antenna elements of the first plurality has a respective non-zero value, wherein the non-zero value of the antenna element of the first plurality comprised in the pair located in the center of the antenna array is configured to compensate for the rotation angle.

10. The signal distribution network of claim 7, further comprising a hybrid for a pair of antenna elements located in a center of the antenna array, the hybrid being configured to:
   provide the fed first signal to, or from, a first antenna element of the pair at a first signal input phase and provide the fed second signal to, or from, the first antenna element of the pair at a second signal input phase; and
   provide the fed first signal to, or from, a second antenna element of the pair at the first signal input phase and provide the fed second signal to, or from, the second antenna element of the pair at the second signal input phase plus $\pi$.

11. The signal distribution network of claim 10, wherein each distribution node is associated with either exactly one of the antenna elements or exactly one hybrid node comprised by the hybrid,
   wherein the antenna elements of the pair reside on an output side of the hybrid and the first and second weighting elements are applied at an input side of the hybrid, the first and second weighting elements of the antenna elements of the pair thereby affecting both antenna elements of the pair,
   wherein the first weighting elements of the distribution nodes associated with exactly one of the antenna elements of the first plurality and the first weighting element of the distribution node associated with a first one of the hybrid nodes are zero, and
   wherein each of the first weighting elements of the distribution nodes associated with exactly one of the antenna elements of the second plurality and the first weighting element of the distribution node associated with a second one of the hybrid nodes has a respective non-zero value, wherein the non-zero value of the first weighting element of the distribution node associated with the second one of the hybrid nodes is configured to compensate for the hybrid.

12. A wireless transmitter or receiver comprising the signal distribution network of claim 7.

13. The wireless transmitter or receiver of claim 12, further comprising the antenna array.

14. A network node or wireless terminal comprising the wireless transmitter or receiver of claim 12.

15. A method of a signal distribution network configured to distribute first and second signals from, or to, respective first and second antenna ports to, or from, first and second pluralities of antenna elements via distribution nodes, wherein each distribution node is associated with at least one of the antenna elements, wherein each antenna element has an antenna element orientation, and wherein each of the first and second pluralities of antenna elements are orderly arranged in an antenna array such that at least some of the antenna elements of the first plurality are co-located with corresponding ones of the antenna elements of the second plurality, the method comprising:
   obtaining a first ordered weighting set comprising a first—zero valued or non-zero valued—weighting element for each distribution node,
      each non-zero valued first weighting element being configured to provide first signal contribution factors for first and second polarizations when combined with the antenna element orientation for the distribution node, wherein at least one of the first signal contribution factors differs from the other first signal contribution factors;
   obtaining a second ordered weighting set comprising a second weighting element for each distribution node,
      each non-zero valued second weighting element being configured to provide second signal contribution factors for the first and second polarizations when combined with the antenna element orientation for the distribution node,
      wherein the second signal contribution factors for the first polarization correspond to complex conjugates of the first signal contribution factors for the second polarization, in reverse order, and
      wherein the second signal contribution factors for the second polarization correspond to negated complex conjugates of the first signal contribution factors for the first polarization, in reverse order;
   feeding the first signal to, or from, the first and second pluralities of antenna elements via the distribution nodes using the first ordered weighting set; and
   feeding the second signal to, or from, the first and second pluralities of antenna elements via the distribution nodes using the second ordered weighting set,
   wherein the first plurality of antenna elements have a same first antenna element orientation and the second plurality of antenna elements have a same second antenna element orientation, and wherein the first and second antenna element orientations are orthogonal,
   wherein the signal distribution network comprises a hybrid for a pair of antenna elements located in a center of the antenna array, the hybrid being configured to:
      provide the fed first signal to, or from, a first antenna element of the pair at a first signal input phase and provide the fed second signal to, or from, the first antenna element of the pair at a second signal input phase; and
      provide the fed first signal to, or from, a second antenna element of the pair at the first signal input phase and provide the fed second signal to, or from, the second antenna element of the pair at the second signal input phase plus $\pi$.

16. The method of claim 15, wherein each distribution node is associated with either exactly one of the antenna elements or exactly one hybrid node comprised by the hybrid,
   wherein the antenna elements of the pair reside on an output side of the hybrid and the first and second weighting elements are applied at an input side of the hybrid, the first and second weighting elements of the antenna elements of the pair thereby affecting both antenna elements of the pair,
   wherein the first weighting elements of the distribution nodes associated with exactly one of the antenna elements of the first plurality and the first weighting element of the distribution node associated with a first one of the hybrid nodes are zero, and wherein each of the first weighting elements of the distribution nodes associated with exactly one of the antenna elements of the second plurality and the first weighting element of the distribution node associated with a second one of the hybrid nodes has a respective non-zero value, wherein the non-zero value of the first weighting element of the distribution node associated with the second one of the hybrid nodes is configured to compensate for the hybrid.

* * * * *